March 4, 1941.  H. A. LINCH  2,233,619

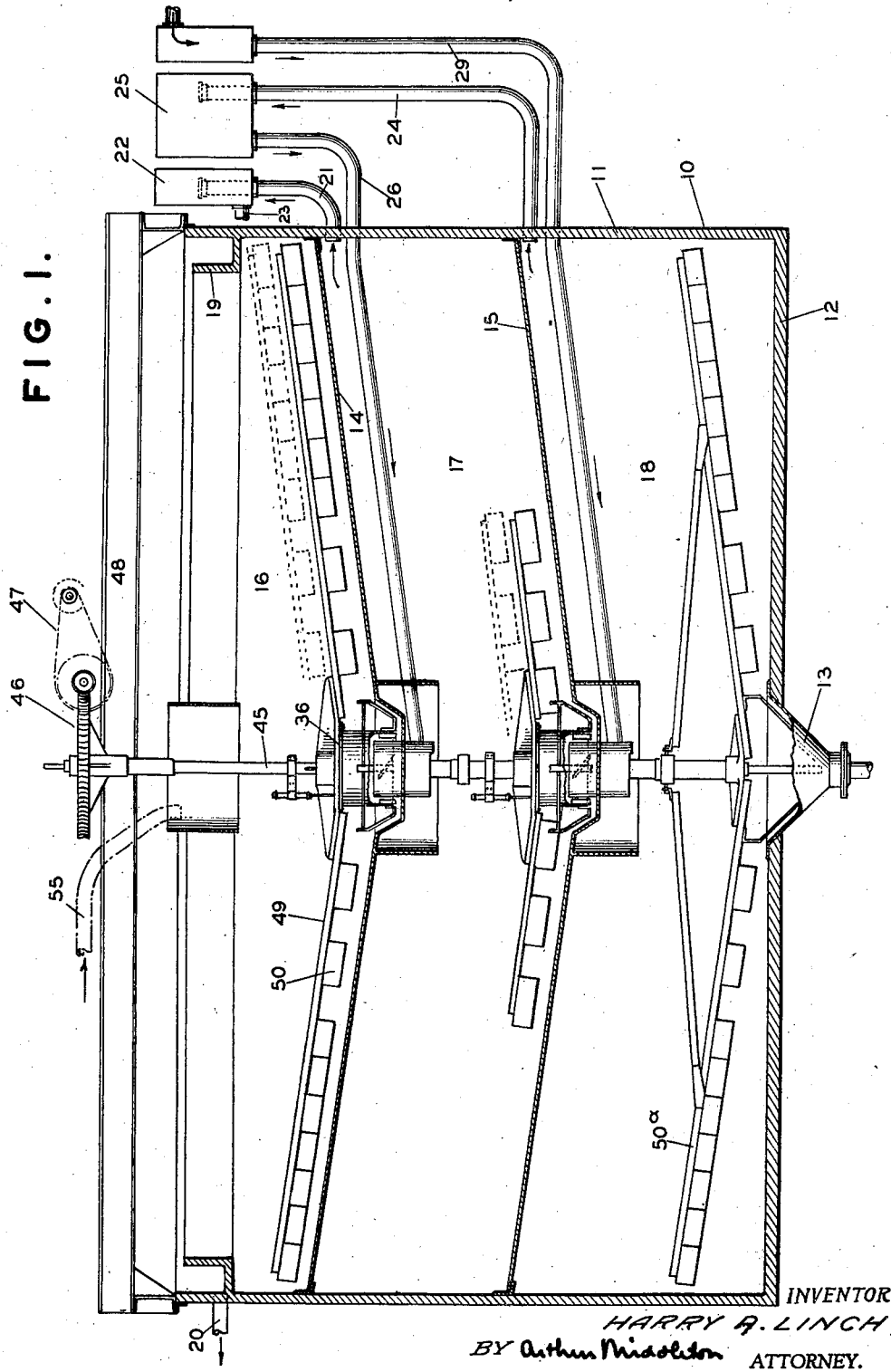

THICKENING APPARATUS

Filed Jan. 10, 1939  4 Sheets-Sheet 2

INVENTOR.
HARRY A. LINCH,
BY
ATTORNEY.

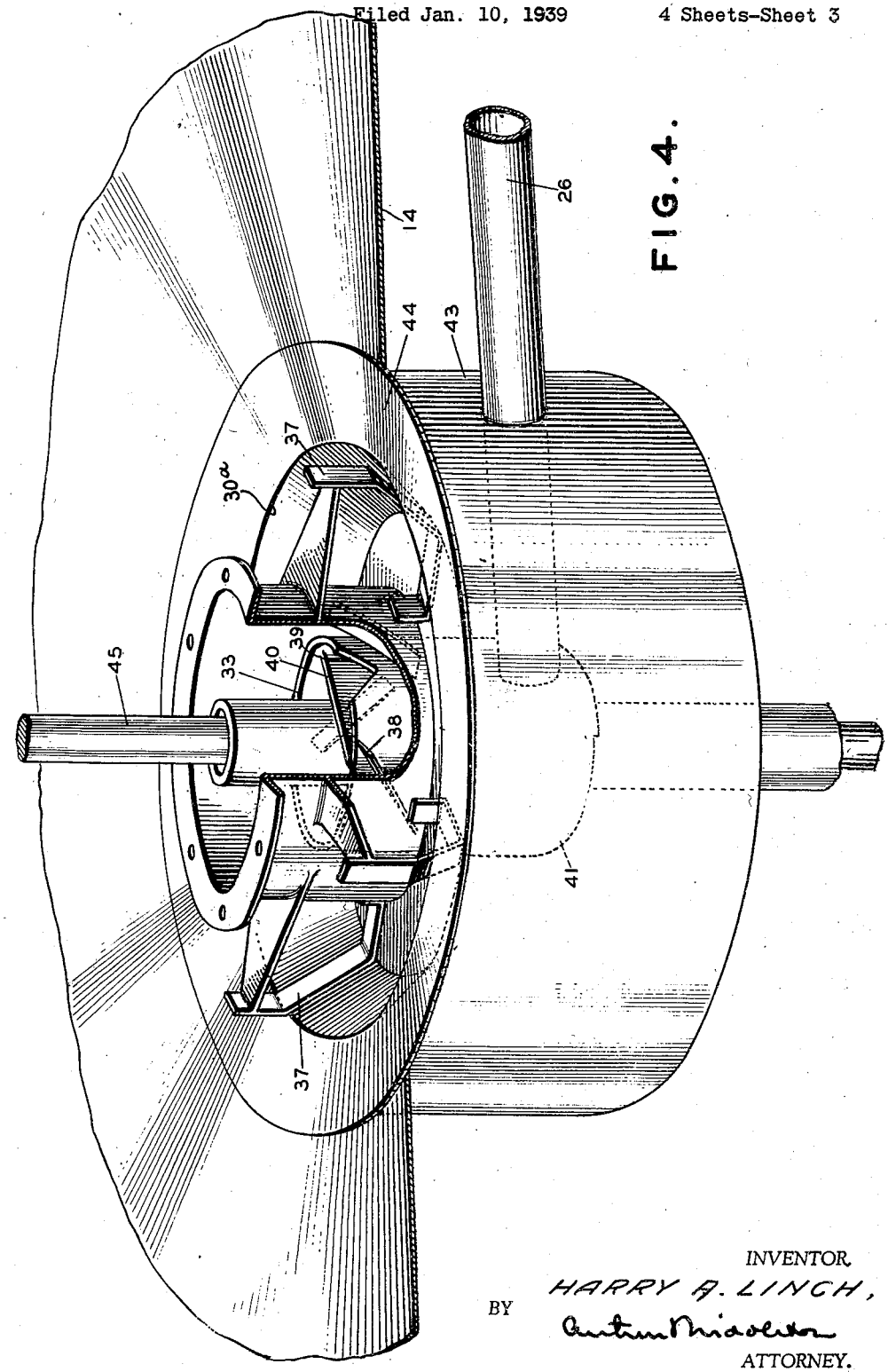

March 4, 1941.  H. A. LINCH  2,233,619
THICKENING APPARATUS
Filed Jan. 10, 1939  4 Sheets-Sheet 4

INVENTOR.
HARRY A. LINCH,
BY
ATTORNEY.

Patented Mar. 4, 1941

2,233,619

UNITED STATES PATENT OFFICE 2,233,619

THICKENING APPARATUS

Harry A. Linch, Westport, Conn., assignor to The Dorr Company, Inc., New York, N. Y., a corporation of Delaware Application January 10, 1939, Serial No. 250,098

15 Claims. (Cl. 210—55)

This invention relates to multiple compartment washing thickener units in which a liquid solids mixture is alternately thickened and rediluted with wash liquid, in passing through the unit.

In such a unit the mixture of liquid and solids, or pulp, or slurry introduced at the top passes in downward sequence through a series of superposed hydraulically connected compartments, while wash liquid introduced at the bottom moves in upward sequence through the compartments, the superposed compartments thus constituting a counter-current washing system in which overflowing clear liquid from a lower compartment serves to re-dilute the thickened material from an upper compartment.

This type of washing thickener (exemplified for instance by the patent to Stedman No. 1,534,145) may be said to comprise a vertical tank subdivided by transverse partitions or bottoms into superposed settling compartments. A vertical rotary element extends centrally through the compartment and has suitably bladed raking means or rake arms for impelling settled solids toward the center. A passage in the way of a centrally located sludge trap arrangement is disposed between any two respective compartments and surrounds the vertical element and ordinarily comprises a boot extending from a central opening in the compartment bottom and a bell-like member or hood surrounding the boot.

In the operation of such a unit, sludge is transferred or displaced from one compartment into the next lower compartment by way of a hydraulic connection or sludge trap as a result of gravitational pressure of the thickened matter or liquid-solids column which builds up in the compartment to the extent that it overcomes the constant although adjustable counter pressure of the clear liquid overflow column that belongs to the compartment next below. Wash liquid or clear overflow water is introduced at the point or in the zone of sediment transfer to effect dilution and washing of the sludge.

Such sludge transfer through the sludge trap usually functions properly where the sludge is of a sufficiently light and flocculent nature such as encountered only with a limited number of materials, but operating difficulties with a washing thickener of this kind are encountered with materials, for instance metallurgical pulps, yielding relatively heavy or gritty or non-floatable constituents or sands in the sediment. Due to their tendency to pack, such materials vitiate the true hydraulic connection between the compartments and consequently upset the operation, as these solids fail to pass or be floated through the passage or trap and eventually cause the same to become congested.

Therefore, it is one of the objects to render units of this type readily operable and controllable with respect to solids transfer from one compartment to the other, in order to make the unit as a whole safely operable for pulps or liquid-solids mixtures of a relatively wider range of characteristics particularly including those containing potentially congestive matter or grit or sands.

This and other objects are obtained by providing positively acting solid transfer means whereby potentially congestive solids are caused to pass through the sludge seal or sludge transfer connection or trap. The invention also avails itself of vertical adjustability or shiftability of the central vertical raking shaft in order that congestive matter may be encouraged to gravitate or cascade from one compartment into the one next below, although the unit continues to perform the desired counter-current washing operation desired.

According to one feature the sludge transfer is effected by way of an upcast boot extending from the compartment bottom, and a hood surrounding the same and connected with the vertical shaft to rotate therewith. The hood is inwardly equipped and unitary with blade-like means effective as the shaft rotates to lift and transfer trapped solids over the top edge of the boot into the interior thereof, while positively acting means are provided exteriorly of the hood to cause congestive deposits to move into the operating range of the solids lifting means within the hood.

According to another feature the settled solids, for instance non-floatable or gritty material or sands, are raked over the compartment bottom to be collected or accumulated in an annular depression or groove that surrounds and forms a part of the upcast boot. Congestive material while being concentrated in the groove is stirred to prevent its packing and to give these solids sufficient mobility or floatability so that they will enter into the path or scooping range of the lifting blades within the hood.

According to another feature, vertically shifting the rake shaft and hence the hood members will cause opening or throttling respectively or what might be called a "valve effect" with regard to the passage of sludge from one compartment to the next. Moreover, the design and arrangement of parts involved in the solids transfer are such as to encourage or facilitate or induce direct gravitational transit of the congestive solids from one compartment to the other, yet otherwise substantially without affecting the intended mode of functioning of this counter-current washing unit and based on the sealing of one compartment against the other.

Still other features have to do with certain refinements to the end of encouraging intimate mixing of thickened material with the diluent or wash liquid in the zone of solids transfer. In order to encourage intimate mixing of the thickened material with the diluent, the mixing is confined to a restricted area of the boot, by causing the thickened material being displaced to escape within a circumferentially restricted zone of overflow as by way of an indentation or notch-like passage provided in the top edge portion of the boot substantially at the point of introduction of the diluent into the boot.

A preferred arrangement or relationship of parts provides that the annular depression and the upcast boot forming part thereof are so dimensioned relative to one another that the top edge of the boot is substantially or approximately flush with the adjacent surrounding portion of the compartment bottom, the result being that the solids can be transferred with the least possible obstruction over the top edge of the boot. The boot, on the other hand, is high enough to provide for normal sufficient overlap with the hood as the same extends into the annular depression. Consequently the relationship of the boot to the surrounding portion of the compartment bottom is such as to encourage some degree of gravitation or cascading of accumulated solids from the compartment bottom over the top edge of the boot when the hood by way of the vertical raking shaft has been sufficiently raised.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 is a longitudinal section of a multiple compartment counter-current washing unit provided with the novel sludge seal and transfer means.

Fig. 4 is an enlarged part-sectional perspective view of the detailed showing of the sealing arrangement in Figs. 2 and 3.

Figure 3:
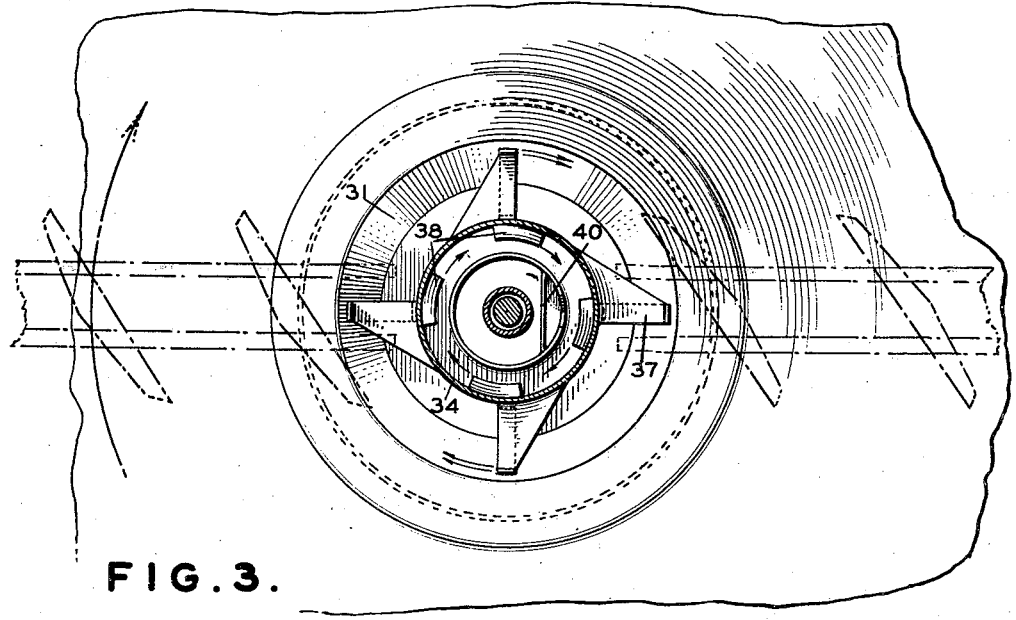
Fig. 3 is a cross-section taken on line 3—3 of the detail of Fig. 2.

The multiple compartment counter-current sedimentation and washing unit shown in Fig. 1 comprises a tank 10 having a cylindrical upstanding wall 11 and a bottom 12 provided with central solids outlet 13. The tank is subdivided by partitions or compartment bottoms 14 and 15 respectively into a number of superposed settling compartments 16, 17, and 18. The top compartment 16 has an overflow launder 19 from which overflowing liquid leaves at 20. The next lower or intermediate compartment 17 has an overflow pipe 21 from which liquid overflows into the overflow box 22 and out at 23. The bottom compartment 18 has an overflow pipe 24 terminating in an overflow box or receptacle 25 from which it is allowed to gravitate back as wash water through a feed pipe 26 into the intermediate compartment 17 for the purpose of rediluting thickened matter obtained from the top compartment as will be hereinafter more specifically described. Fresh wash liquid is introduced through feed pipe 29 for the re-dilution of sludge entering the bottom compartment 18.

Each of the compartment bottoms 14 and 15 is shown to be provided with, and to have centrally arranged therein a sludge trap-and sludge transfer means according to this invention. For example, in the compartment bottom 14 the sludge trap and sludge transfer means (see also Figs. 2 and 3) comprise the following parts:

The sealing means proper comprise a depressed annular sump-like portion 30 in which settled solids from the compartment bottom are adapted to be collected. This depressed portion consists of an inverted conical outer wall portion 31, an annular bottom portion 32, and an upcast cylindrical portion or boot 33, the height of which is shown to be substantially equal to the depth of the annular depression 30 and substantially on a level with the lowermost portion of the slightly conical compartment bottom 14. In other words, the annular depression or annular trough 30 is formed by what is in effect a substantially abrupt annular break in the slope of the compartment bottom 14. The point of that break is designated by the numeral 30ᵃ and it is herein also considered to be the determining point in measuring the depth of the annular trough 30. A bell or hood portion 34 surrounds the boot 33, and constitutes part of a rotary raking system hereinafter to be described, and as such, the hood portion comprises the cylindrical portion 35 and the rotary hub portion 36 of the rotary system. Settled solids collected in the annular depression 30 are adapted to pass through the annular space 36a between the outer hood portion 34 and the inner upcast boot 33 and over the top edge portion of the latter down into the next lower compartment.

Cooperatively associated with these sealing means are means for expediting the transfer of the solids through the seal or trap, and hereinafter called the solids transfer means. These transfer means are shown to comprise stirrers 37 fixed outwardly to the hood portion 34 and shown to conform substantially to a portion of the inner contour of the annular depression 30, and adapted to prevent the packing of solids in that annular depression, and further to comprise inwardly attached to the hood portion 34 solids engaging means or inclined scooping blades 38 equally adapted to prevent packing of solids but also effective to facilitate or to induce the transfer of solids over the top of the upcast boot 33 into the next lower compartment.

Since for the purpose of counter-current washing the settled solids or thickened matter or sludge should be rediluted with wash liquid in the process of transfer of the solids from one compartment to the next, this invention provides as a refinement means to effect a more intimate mixing of the solids being transferred with the wash liquid. For this reason, the upcast boot 33 has an overflow notch 39 which, by causing the solids to pass therethrough, causes the transfer area to be relatively confined. The zone of confinement is further determined by a vertical baffle 40 cooperatively associated with the overflow notch 39, so that the solids in transfer from the upper to the next lower compartment will be confined to a fraction of the free cross-sectional flow area of the boot 33. This makes possible the intimate mixing of the thickened matter or solids with the wash liquid entering through the aforementioned feed pipe 26 (shown in Fig. 2) to terminate in a downward extension 41 or the like of the upcast boot 33. An auxiliary baffle portion 42 is provided horizontally just below the point of mixture of the solids and the wash liquid, thus further defining a zone of confinement within which the mixing is caused to take place.

There is further shown to be provided a downcast cylindrical baffle wall 43 surrounding the entire zone of transfer and which is herein shown to form a structural unit with the depressed annular portion 30, which structural unit in turn is shown to be marginally connected as at 44 with the surrounding compartment bottom 14.

The rotary raking mechanism comprises a vertical rotary shaft 45 driven as by worm gearing collectively indicated by the numeral 46 and by a motor drive indicated at 47, the shaft and the drive means being supported from a transfer overhead structure such as beams 48 mounted upon the top portion of the tank.

Each of the compartments 16 and 17 is shown to be provided with substantially identical rake arm constructions, the rake arms pertaining to a compartment 16 for example, comprising the above mentioned hub portion 36 having attached thereto radially extending bladed solids raking arms 49 having blades 50 and adapted to convey or impel incident to the rotation of the shaft 45 settled solids over the compartment bottom to and into the annular depression 30 for the purpose of transfer thereof into the next lower compartment. The bottom compartment 18 has a similar set of bladed rake arms 50a adapted to convey the final settled solids to the central discharge 13. Suitable cylindrical spacers such as the one indicated at 51 (see Fig. 5) surround the shaft 45 to hold the respective rake arm assemblies in their proper positions upon the shaft, the rake arm assemblies incidentally having torque transmitting connections with the shaft by way of suitable means such as a key indicated at 52.

The operation of the unit is, as follows:

Through the feed pipe 55 (see Fig. 1) the initial liquid solids mixture enters the top compartment 16 where clarified or clear liquid overflows into the launder 19, while solids settle on the compartment bottom 14 forming the thickened matter or sludge which, incident to the rotation of the rake arms 49, is then conveyed to the center of the compartment where the sludge is caused to pass by way of sludge trap and solids transfer means into the compartment 17 below, permitting the downward one-way passage of thickened material while prohibiting direct counter-current upward escape of clarified liquid from the lower compartment 17 into the upper compartment 16. The construction and function of the sludge trap-and solids transfer means will be more specifically described below.

In a zone of solids transfer from the upper to the lower compartment, the sludge is rediluted with wash liquid entering through the pipe 26, whereupon the settling process is repeated in compartment 17, with clear liquid overflowing from pipe 21 to leave the overflow receptacle 22 at 23, the solids settling upon the compartment bottom 15 again to be raked to the center for transfer into the bottom compartment 18. While being transferred to and into compartment 18, the thickened matter is rediluted with a liquid diluent or wash liquid entering through pipe 29. The solids thus having been treated in the two washing steps represented by compartments 17 and 18, settle on the bottom 12 of the tank to be raked to outlet 13 for discharge from the tank.

Figure 2:
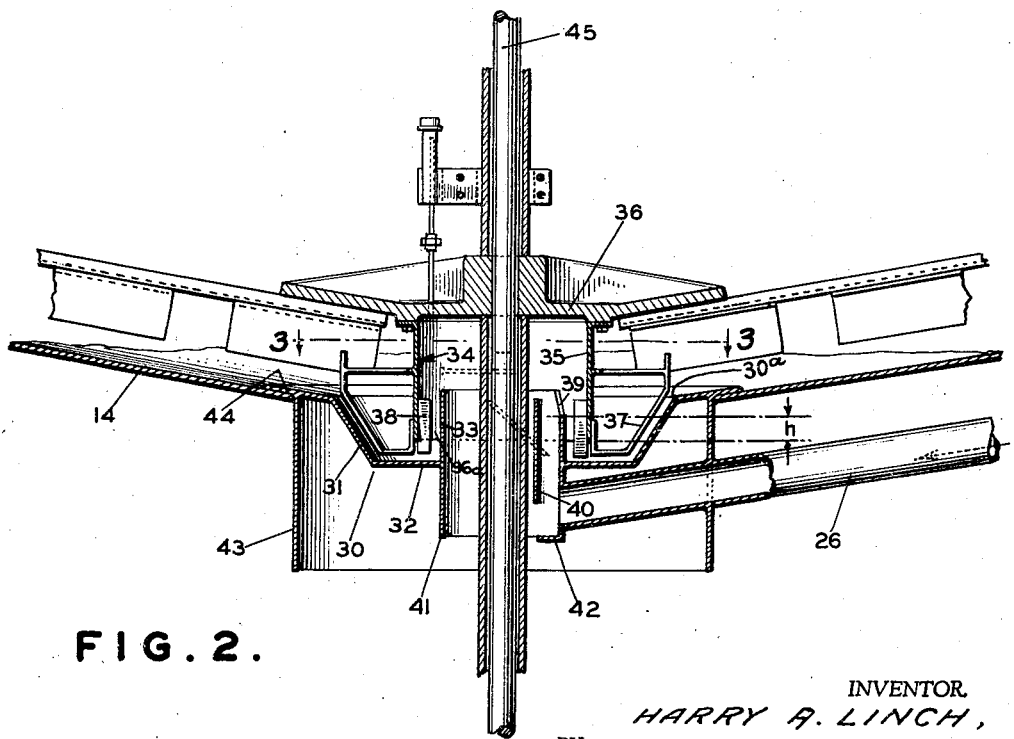
Fig. 2 is an enlarged detailed view of the sludge sealing and transfer means shown in Fig. 1.

Referring to Fig. 2, the specific function of the sludge trap-and transfer between the compartments will now be described:

The sludge solids that are raked to the center of a compartment bottom, for instance bottom 14, collect in the annular depression 30, where they are kept from packing therein by the action of the stirrers 37. As the thickened matter or solids thus are maintained at a degree of mobility or flowability under the influence of the stirrers, pressure of the sludge accumulating above will tend to pass them under the hood portion 34 and into the range of the scooping blades 38 inside the hood, which scooping blades will then act or help to raise them through the annular space 36a and over the top edge portion of the upcast boot 33 or through the notch-like passage 39 respectively as the case may be. It will be seen that the stirrers 37 and the scooping blades 38 rotating with the hood member 34 incident to the rotation of the rake assembly, operate in the depression 30 to transfer the solids or sands, in spite of other possible tendency to pack, in smoothly continued transit through the sludge trap from one compartment to the other.

Unless the quantity of solids and their rate of transit through the compartment causes them to overflow the top edge of boot 33, they will be carried by the scooping blades 38 more or less around the boot 33 to cause them to pass through the notch-like passage 39 that is at a restricted portion of the boot circumference and on down through a relatively confined transfer zone realized through the cooperative association of the notch-like passage 39 with the vertical baffle 40, this confined transfer zone thus constituting a fraction of the free total cross-sectional area of the boot.

The solids or thickened matter thus passing in transfer down through the boot are met by, and caused to be intimately mixed with the liquid diluent or wash liquid that enters through pipe 26 into the interior of the downward extension 41 of boot 33. The auxiliary horizontal baffle portion 42 just below the outlet end of pipe 26, further helps to define a confined or restricted zone of mixture due to cross flow of the descending solids and the laterally entering wash liquid. The thus rediluted thickened matter passes on downwardly still somewhat confined by the downcast cylindrical outer baffle portion 43 below which, however, separation again takes place, as clear liquid rises to overflow, while solids settle to the bottom.

Again referring to Fig. 2, there will be noted an effective overlap indicated by the character "h" between the boot 33 and the surrounding hood portion 34, creating an annular effective sealing zone of the depth $h$, which is intended to prevent the escape of clear liquid from the lower compartment through the sludge transfer passage into the upper compartment, thus causing the clear liquid to properly overflow through its respective overflow means from its respective compartment.

However, in the operation of this machine, even though equipped with the solids transfer expedients herein described, solids or sands in the mixture under some conditions are nevertheless liable to cause congestion in the transfer zone due to their inability to rise or to be raised through the sludge sealing zone between the boot and the hood and over the effective top level of the boot 33.

Because of such difficulty on account of heavy solids or sands contained in some sludges, there are herein provided means for adjusting the overlap $h$, in other words, for varying the effective resistance which the overlap $h$ offers to the transfer of the solids through the passage or trap. Hence, there is provided the spindle 53 (see Fig. 5) and handwheel 54 which latter may be rotated for raising or lowering the raking assembly as a whole, that is the shaft 45 and the rake arms thereon, to increase or decrease the overlap $h$, thus creating what might be called a regulatable "throttling or valve effect" as between the boot 33 and the hood member 34 with respect to the passage of solids between them.

Figure 5:
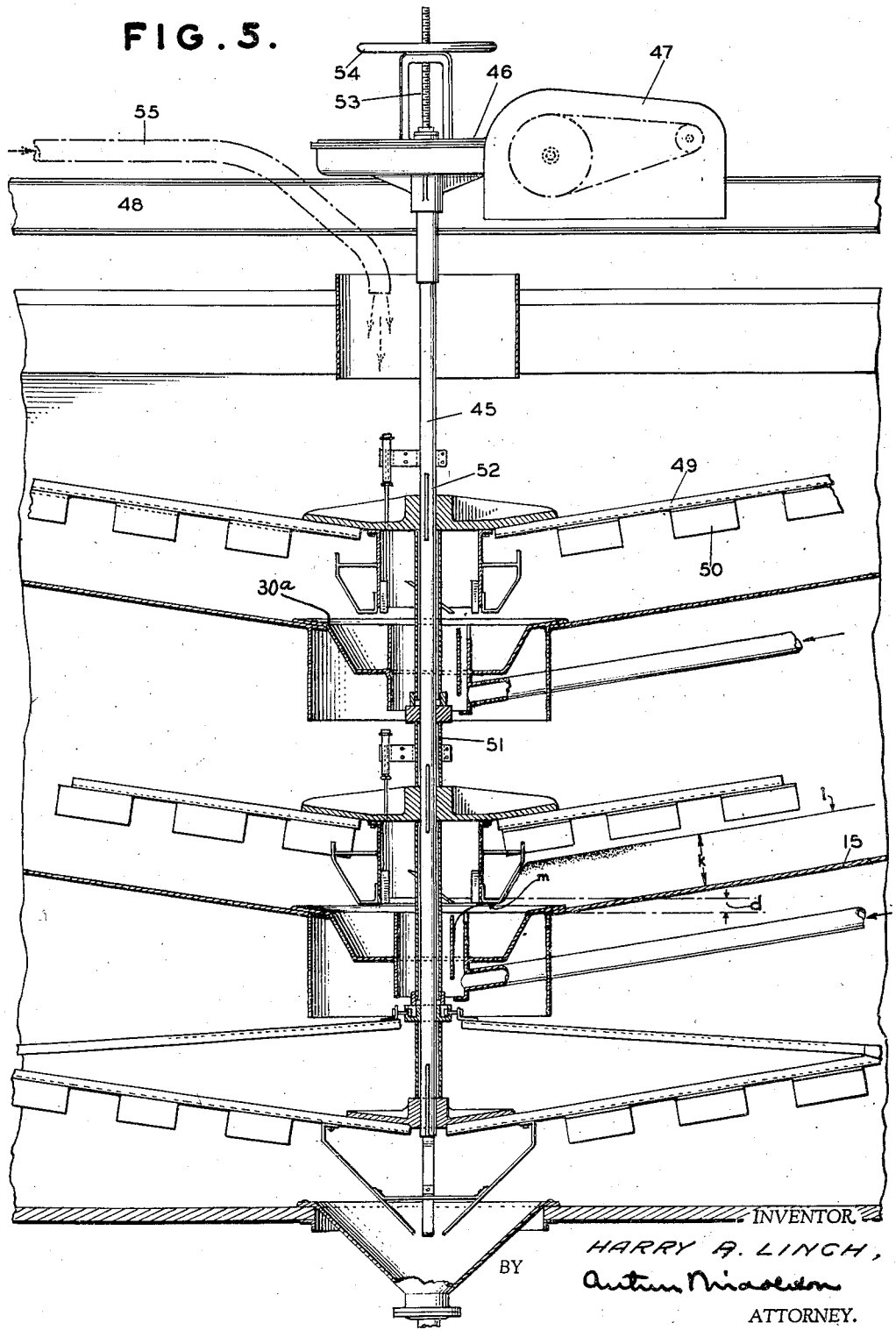
Fig. 5 is a somewhat enlarged view of the vertical central portion of Fig. 1, with rake shaft and rake mechanism in raised position in a case of relative solids congestion.

Fig. 5 shows how the raising of the raking assembly, as a matter of solids flow adjustment, affects the passage of the solids from one compartment to the next lower compartment. In this instance, illustrating an extreme phase of operation the raking assembly is raised high enough so that a vertical gap $d$ appears between the lower edge portion of the hood portion 35 and the top edge portion of the boot 33. As indicated in Fig. 5, such extreme instance of adjustment with respect to the passage of solids is herein employed where a relatively large percentage of material of strong packing characteristics must be handled. Therefore, assuming that settled material has packed to a thickness $k$ (see Fig. 5) for instance on compartment bottom 15, such packed material will also fill the annular depression 30, while solids within the reach of the stirrers 37 and of the scooping blades 38 are kept in transit through the zone of transfer. This means that the solids which are raked toward the center along the level $l$ of the packed material are brought into the range of action of the stirrers 37 as they cascade down from level $l$ to a level $m$ formed on the packed material by the stirrers 37, from which level $m$ the stirrers 37, as well as the scooping blades 38 will cause the solidds in transit to further cascade down over the gap $d$ between the hood portion 35 and the boot 33.

This phase of adjustment then makes the solids follow a gravitational tendency incident to the transit of solids from level $l$ over level $m$ into the interior of the boot, although in such a manner that the intended mode of function of the unit as a counter-current washing thickener is not lost, because the relative abundance of sands kept in transit through the transfer zone is effective to seal the gap $d$ against the clear liquid from the next lower compartment.

What I claim is:

1. In an apparatus for settling solids from a liquid solids suspension, a tank structure having transverse compartment bottoms dividing said tank structure into superposed compartments comprising a lower compartment and an upper compartment immediately above the lower compartment and having a centrally disposed bottom opening connecting it with the lower compartment, each compartment adapted to have solids settle therein to form a zone of sludge, each compartment having means for overflowing supernatant liquid, and also having sludge sealing means associated with said opening between the upper and the lower compartment and adapted to prevent passage through said opening of clarified liquid from the lower into the upper compartment, said sealing means comprising an upcast boot extending from said opening, and a hood member surrounding said boot and constituting part of the rotary solids raking assemblage hereinafter mentioned, said hood member having unitary therewith solids engaging means extending from the inner faces thereof and adapted to lift and transfer over the top edge of said boot, solids collected by said raking assemblage incident to the rotation thereof, a solids raking assemblage comprising a vertical rotary element and solids conveying means extending from said rotary element and effective to convey settled solids towards the center of rotation and into the range of action of said solids engaging lifting and transferring means, means for feeding a liquid solids mixture into the upper compartment and adapted to cause said sludge to build up therein which sludge is adapted to be displaced through said sealing means into the lower compartment against and over the hydraulic pressure in the lower compartment, which pressure in turn is defined by the overflow level of said lower compartment relative to the overflow level of the upper compartment, and means for introducing a liquid diluent for mixture with thickened material being transferred from the upper to the lower compartment.

2. Apparatus according to claim 1, in which the compartment bottom between the upper and the lower compartment is formed with a centrally disposed relatively depressed portion from the bottom of which rises said upcast boot to constitute with said depressed portion an annular trough in the compartment bottom, adapted to receive solids conveyed thereto, and into which annular depression said hood member extends.

3. Apparatus according to claim 1, in which the compartment bottom between the upper and the lower compartment is formed with a centrally disposed relatively depressed portion from the bottom of which rises said upcast boot to constitute with said depressed portion an annular trough in the compartment bottom, adapted to receive solids conveyed thereto, and into which annular trough said hood member extends, and in which the height of the upcast boot is so dimensioned and a surrounding hood member so designed and disposed with respect to said upcast boot, that normally the overlap between said boot and said hood member is not larger than the depth or drop of said depressed portion with respect to the adjacent portion of the compartment bottom.

4. Apparatus according to claim 1, in which the compartment bottom between the upper and the lower compartment is formed with a centrally disposed relatively depressed portion from the bottom of which rises said upcast boot to constitute with said depressed portion an annular trough in the compartment bottom, adapted to receive solids conveyed thereto, and into which annular trough said hood member extends, with the addition of stirring means effective in said annular trough exteriorly of said hood member and rotating therewith.

5. Apparatus according to claim 1, in which the compartment bottom between the upper and the lower compartment is formed with a centrally disposed relatively depressed portion from the bottom of which rises said upcast boot to constitute with said depressed portion an annular trough in the compartment bottom, adapted to receive solids conveyed thereto and into which annular trough said hood member extends, and in which the height of the upcast boot is so dimensioned and the surrounding hood member so designed and disposed with respect to said upcast boot, that normally the overlap between said boot and said hood member is not larger than the depth or drop of said depressed portion with respect to the adjacent portion of the compartment bottom, with the addition of stirring means effective in said annular exteriorly of said hood and rotating therewith, and means for vertically adjusting said rotatable assembly.

6. Apparatus according to claim 1, in which the upcast boot has a circumferentially restricted overflow portion for thickened matter being displaced through the sealing means, and means for confining the zone of mixture of the thickened matter thus being displaced with the diluent to a space smaller than the free cross-sectional area of the boot.

7. Apparatus according to claim 1, in which the upcast boot has a downcast extension into which said diluent is fed, and means for confining the zone of mixture of thickened matter being displaced over the top edge portion of the boot with the diluent to a portion of the space within the boot.

8. Apparatus according to claim 1, in which the upcast boot has a circumferentially restricted overflow portion for thickened matter being displaced through the sealing means, a baffle construction within the boot and designed to confine the matter being displaced to a portion of the space within the boot, which is proximate to said restricted overflow portion, and means for introducing said diluent in said confined space for mixture with said thickened matter.

9. In an apparatus for settling solids from a liquid solids suspension, a tank structure having at least one transverse compartment bottom dividing said tank structure into at least two superposed compartments comprising a lower compartment and an upper compartment immediately above the lower compartment, said compartment bottom having a centrally disposed depressed portion formed by an annular break in said bottom, the point of the break being defined by a substantially abrupt change of slope of the bottom, the point of said break also determining the depth of said depressed portion, said depressed portion in turn having a centrally disposed opening in the bottom connecting the upper with the lower compartment, each compartment adapted to have solids settle therein to form a zone of sludge, each compartment having means for overflowing supernatant liquid, sludge sealing means associated with said opening between the upper and the lower compartment and adapted to prevent passage through said opening of clarified liquid from the lower into the upper compartment, said sealing means comprising an upcast boot extending from said opening to constitute with said depressed portion an annular trough in the compartment bottom, and a hood member surrounding said boot and constituting part of the rotary solids raking assemblage hereinafter mentioned, and adapted to extend into said annular depressed portion, the height of the upcast boot being so dimensioned and the surrounding hood member so designed and disposed with respect to said upcast boot, that normally the overlap between said boot and said hood member is not larger than the depth of said depressed portion as measured from the point of said break in the compartment bottom, a solids raking assemblage comprising a vertical rotary element and solids conveying means extending from said rotary element and effective to convey settled solids towards the center of rotation and into said annular trough, means for feeding a liquid-solids-mixture into the upper compartment, adapted to cause said sludge to build up therein and sludge therefrom to be displaced through said sealing means into the lower compartment against and over hydraulic pressure in the lower compartment, which pressure in turn is defined by the overflow level of said lower compartment relative to the overflow level of the upper compartment, and means for introducing a liquid diluent for mixture with sludge being transferred from the upper to the lower compartment.

10. Apparatus according to claim 9, in which the height of the upcast boot is so dimensioned and the surrounding hood member so designed and disposed with respect to said upcast boot, that normally the overlap between said boot and said hood member is not larger than the depth of said depressed portion as measured by the point of said break in the compartment bottom.

11. Apparatus according to claim 9, in which the top edge of the boot is substantially level with the point of the break in the compartment bottom in which said depressed portion is formed.

12. Apparatus according to claim 9, in which the upcast boot has a circumferentially restricted overflow portion for thickened matter being displaced through the sealing means, and means for confining the zone of mixture of the thickened matter thus being displaced with the diluent liquid to a space smaller than the free cross-sectional area of the boot.

13. Apparatus according to claim 9, in which the top edge of the boot is substantially level with the point of said break in the compartment bottom, with the addition of means for raising said rotatable assembly sufficiently so as to enable sludge on the compartment bottom to gravitate across the sludge-filled annular trough substantially directly into said upcast boot.

14. In an apparatus for settling solids from a liquid solids suspension, a tank structure having at least one transverse compartment bottom dividing said tank structure into at least two superposed compartments comprising a lower compartment and an upper compartment immediately above the lower compartment and having a centrally disposed bottom opening connecting it with the lower compartment, each compartment adapted to have solids settle thereon to form a zone of sludge, each compartment having means for overflowing supernatant liquid, sludge sealing means associated with said opening between the upper and the lower compartment and adapted to prevent passage through said opening of clarified liquid from the lower into the upper compartment, said sealing means comprising an upcast boot extending from said opening in the compartment bottom, said boot having a circumferentially restricted overflow portion for thickened material being displaced through the sealing means, a hood member surrounding said boot and constituting part of the rotary solids raking assemblage hereinafter mentioned, a solids raking assemblage comprising a vertical rotary element and solids conveying means extending from said rotary element and effective to convey settled solids towards the center of rotation and into said annular depression, means for feeding a liquid-solids-mixture into the upper compartment, adapted to cause said sludge to build up therein and sludge therefrom to be displaced through said sealing means into the lower compartment against and over the hydraulic pressure in the lower compartment, which pressure in turn is defined by the overflow level of said lower compartment relative to the overflow level of the upper compartment, and means for introducing a liquid diluent for mixture with thickened material being transferred from the upper to the lower compartment.

15. Apparatus according to claim 14, with the addition of baffle means in the upcast boot, said baffle means being cooperatively associated with said restricted overflow portion of the boot in a manner to establish a relatively confined zone within the boot, in which to mix the diluent liquid with thickened material being displaced through said sealing means.

HARRY A. LINCH.